July 29, 1969

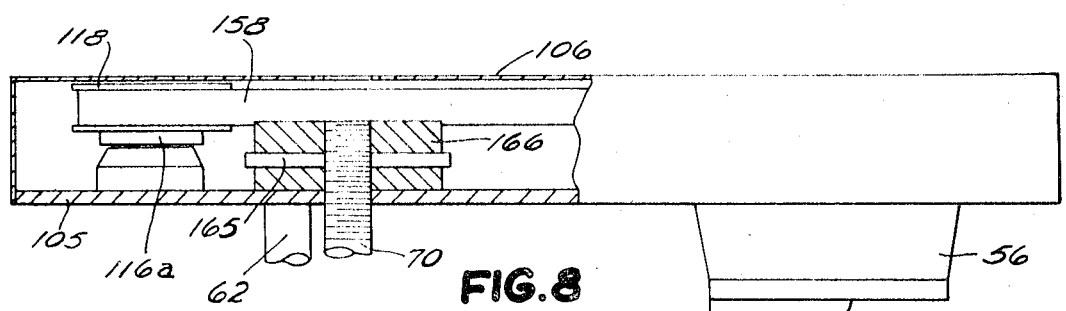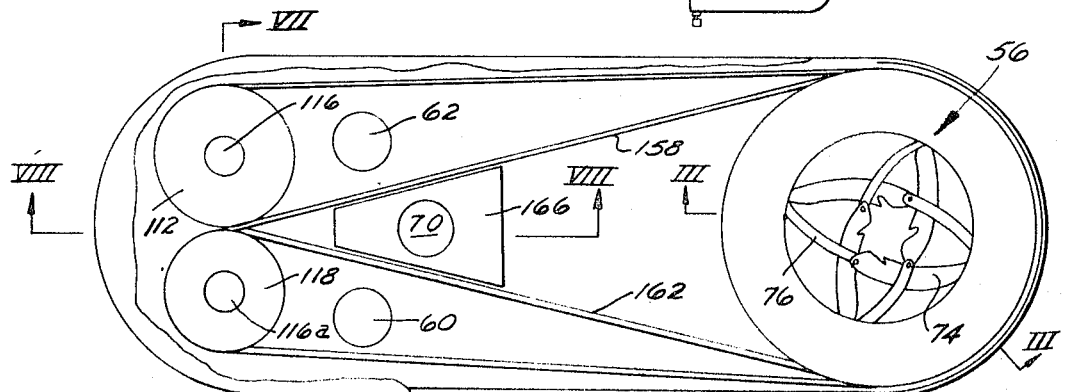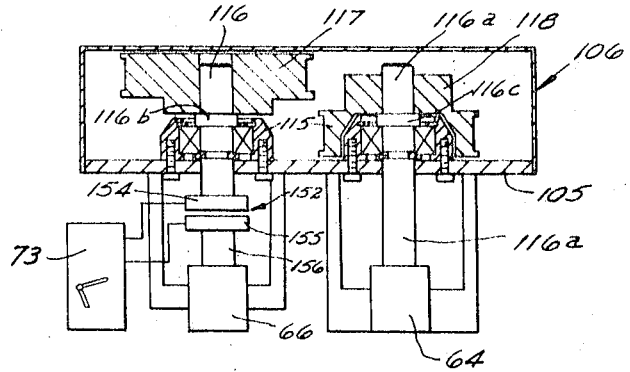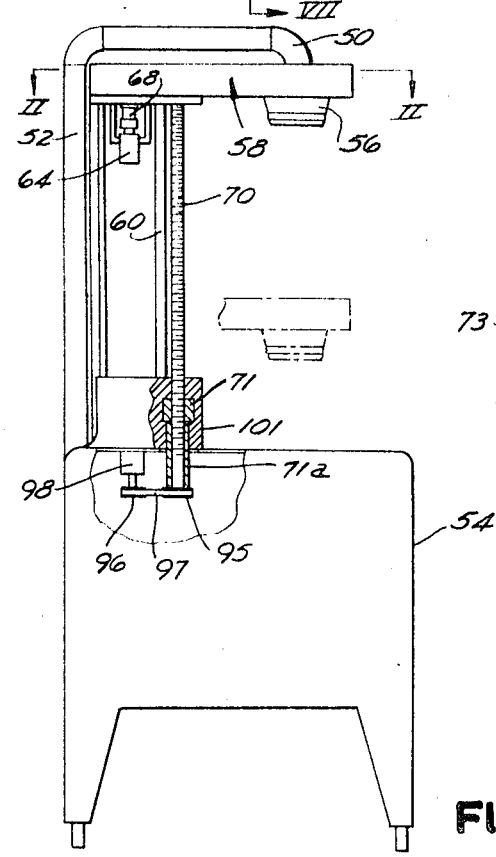

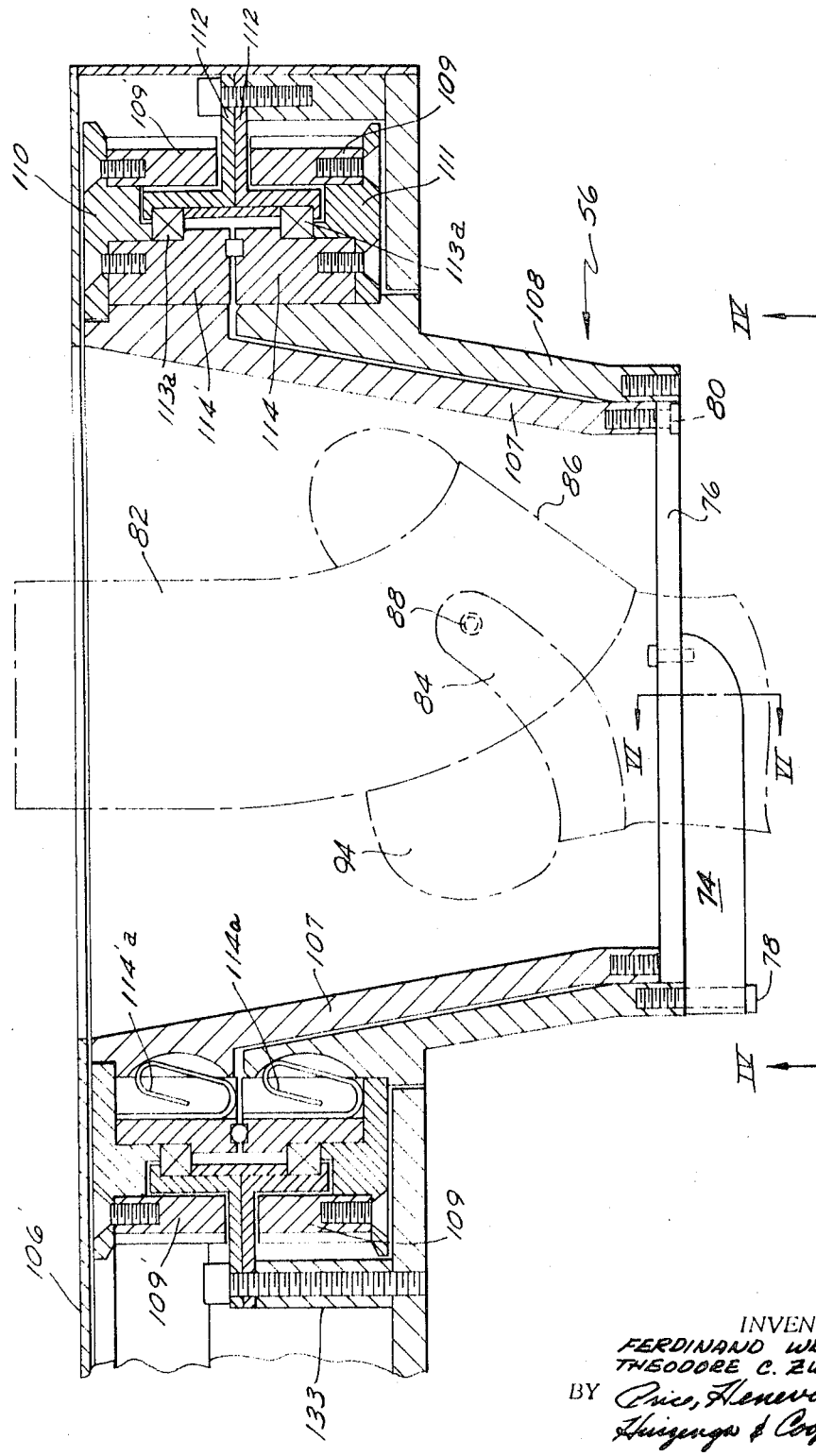

T. C. ZWIEP ET AL 3,457,586

DEBONING APPARATUS

Filed April 10, 1968

INVENTORS
FERDINAND WEITS
THEODORE C. ZWIEP
BY
ATTORNEYS

United States Patent Office 3,457,586
Patented July 29, 1969

3,457,586
DEBONING APPARATUS
Theodore C. Zwiep, Grand Rapids, and Ferdinand Weits, Holland, Mich., assignors to Prince Manufacturing Company, Holland, Mich., a corporation of Michigan
Filed Apr. 10, 1968, Ser. No. 720,052
Int. Cl. A22c *17/00;* A22b *5/00*
U.S. Cl. 17—1        23 Claims

ABSTRACT OF THE DISCLOSURE

This disclosure relates to a method and apparatus for removing meat from bones. The meat is removed by plowing the meat away from the bone by a plurality of dull plow members which rotate about the bone and are urged against the bone to force the meat away from and separate it from the bone without cutting the meat. Special tools are disclosed for holding the different ends of the bone so that the bone can be held without crushing during the deboning operation. Special tools are also disclosed for removing kneecaps and fibula bones prior to the meat stripping operation.

---

This invention relates to deboning of meat cuts such as animal legs, shoulders, and the like. In one of its aspects, the invention relates to removing bones from animal meat cuts by a method comprising holding an end of the bone so that the bone is restrained from longitudinal and rotational movement, rotating dull edged plowing members about the bone while simultaneously urging the dull edged plow members against the bone and effecting relative longitudinal movement between the bone and the plowing members such that the rotating plow members move away from the held end of the bone whereby the meat is plowed away from the bone intact, without cutting of the meat.

In another of its aspects, the invention relates to removing bones from animal meat cuts such as legs, shoulders, and the like with an apparatus comprising a bone holding means; a meat plowing means, including a plurality of dull edged plow members having means for urging the plow members against a bone in the holding means; means for effecting relative rotation between a bone in the bone holding means and the plowing member such as that the plow members rotate relative to a longitudinal axis of the bone, and means for effecting relative longitudinal movement of the plow members along the bone holding means as the plow members rotate relative to the longitudinal bone axis.

The desirability of deboning meat such as hams, beef, and the like has long been recognized. It is also recognized that it is highly desirable to remove the bones from meat in a mechanized operation due to the high cost and shortage of skilled labor.

Many machines have been devised for removing bones from meat cuts. The problems inherent in the bone removing operation are caused by the varying sizes and irregular shapes of the bones. One requirement for the deboning process is that substantially all of the meat is removed from the bone while the meat remains substantially intact.

One approach to the problem has been proposed by Terranova in his U.S. Patents 2,785,434 and 3,210,801. The principle applied by Terranova is to force a plurality of rotating sharpened blades axially along a bone of the meat cut, whereby the bone is enveloped by the rotating blades on a programmed profile and the meat is cut away from the bone. This operation, while being substantially automated, leaves substantial amounts of meat on the bone or tends to gouge out pieces of bone due to the irregular shape of the bone and the inability of the programming to follow the true profile.

Another machine has been proposed by Massengill in his U.S. Patents 2,857,619, 2,893,051 and 2,932,060. The principle employed by Massengill is to literally pull the bone out of the meat while holding the meat against a restricted variable opening which scrapes the meat from the bone. Due to the inability of the variable opening to conform to all irregularities of the bone, considerable amount of meat is left on the bone, requiring at least a semi-skilled operator to strip the rest of the meat from the bone during the scraping operation. Further, problems occasionally arise due to the fact that the bones are crushed during the pulling operation.

We have now discovered a completely automated process and apparatus for substantially completely removing meat from bones such as hams, beef shoulders and legs, and the like, by plowing meat away from the bone with a plurality of dull edged rotating plow members as the plow members traverse the bone. In this manner, the meat is separated from the bone without tearing or cutting apart of the meat.

By various aspects of this invention one or more of the following, or other objects can be obtained.

It is an object of this invention to provide a completely automated process and apparatus for removing bones from meat while leaving substantially no meat on the bones.

It is a further object of this invention to provide an improved bone holding chuck for an end of a tibia bone for a deboning apparatus which exerts longitudinal force on the bones, wherein the bone is held without crushing.

It is a further object of this invention to provide an improved bone holding chuck for bones in which the bones are easily inserted and removed and which hold the bone from longitudinal and rotational motion without a crushing force.

It is a further object of this invention to provide an improved machine for deboning animal meat cuts such as legs, shoulders, and the like wherein operator injury from sharp cutting blades is avoided.

It is yet another object of this invention to provide an improved meat deboning apparatus wherein an improved chuck holds femur bones against longitudinal and rotational motion during a deboning operation wherein the bones are easily loaded into and unloaded from the chuck.

Other aspects, objects, and the several advantages of this invention are apparent to one skilled in the art from a study of this disclosure, the drawings, and the appended claims.

According to the invention, there is provided an improved method for removing bones from animal meat cuts such as legs, shoulders, and the like. The method includes the steps of holding an end of the bone so that the bone is restrained from longitudinal and rotational movement, urging rotating dull edged plow members against the bone while effecting relative longitudinal movement between the bone and the plowing members such that the rotating members move away from the held end of the bone. In this manner, the meat is plowed away from the bone intact without cutting or tearing of the meat. Additionally, by this method, the force of the plowing members plowing the meat away from the bone enhances the ability of the meat to stay intact while pulling the meat away from the bones.

Preferably, the bone is hung pendulously so that the bone can automatically center itself within the rotating plow members as the plow members move downwardly relative to the bone.

In one embodiment of this invention, a leg bone is removed from the meat surrounding the bone by first removing the fibula bone before the plowing operation.

In another embodiment of this invention, a leg bone is removed from the meat surrounding the same by first removing a kneecap from the bone before the plowing operation.

Preferably, the bone is held at an enlarged and exposed end portion without clamping of the bone so that the bone is prevented from rotation about its longitudinal axis. In removing leg bones from the meat surrounding the same, the tibia or the femur bone can be held.

In a preferred embodiment of this invention, the tendons within the meat are pulled away from the bone during the plowing operation as the plow members rotate about the bone.

Also according to the invention, there is provided an apparatus for removing bones from meat cuts such as legs, shoulders, and the like. The apparatus comprises a bone holding means, a meat stripping means including a plurality of dull edged plow blades resiliently urged against a bone in the bone holding means, and means to move the rotating plow blades along the bone away from the bone holding means to plow the meat away from the bone.

The invention will now be described with reference to the accompanying drawings in which:

FIG. 1 is a side elevational view of a machine embodying the invention;

FIG. 2 is a plan view, partly in section, taken along lines II—II of FIG. 1;

FIG. 3 is a side elevational view of the stripping cone seen along lines III—III of FIG. 2;

FIG. 7 is an elevational view taken along lines VII—VII of FIG. 2;

FIG. 8 is a side elevational view of the cone supporting arm taken along lines VIII—VIII of FIG. 2;

Figure 4:
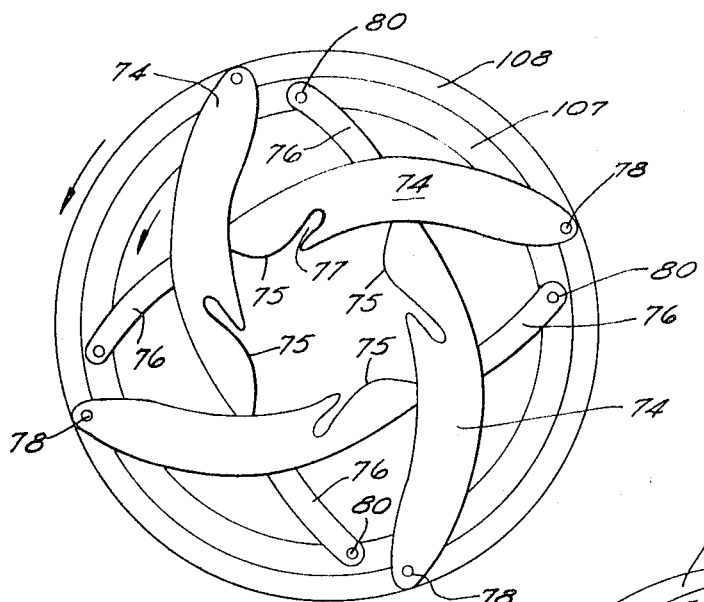
FIG. 4 is a bottom view of the plow assembly seen along lines IV—IV of FIG. 3.

Referring now to the drawings, and to FIG. 1 in particular, a meat deboning machine contains a bone supporting arm 50 rigidly supported by a shaft support 52 on a base housing 54. A meat stripping cone assembly 56 is provided operably suspended from a stripping cone supporting arm 58. A pair of vertical supporting rods 60 and 62 (FIG. 2) are rigidly attached to the stripping cone supporting arm 58 and are slidably engaged within block 101 of base 54. The stripping cone supporting arm 58 is moved upwardly and downwardly relative to base housing 54 by a threaded rod 70 secured by a pin 165 to block 166. Nut 71 is supported by bearings (not shown) within the block 101. A motor 98 drives the nut 71 through sleeve 71a, pulley wheel 96, pulley belt 97, and pulley wheel 95. The motor 98 can be provided with controls (not shown) for reversing the direction of drive to thereby change the direction of rotation of nut 71. The manner of driving the nut 71 is shown schematically and forms no part of this invention. Many other ways of driving the nut will be suggested to those skilled in the art. The stripping cone assembly 56 is driven rotatably by a plow driving motor 64 and a cam follower driving motor 66 in a manner which will be described hereinafter.

Referring now to FIGS. 2 through 5, the meat stripping cone 56 comprises a cam follower cone 107 (so named because its rotary movement is responsive to the contour of a bone, which acts as a cam) and a plow cone 108 mounted concentrically for rotation within the stripping cone support arm 58. A plurality of plow blades 74 are rotatably mounted at one end through bolts 78 to plow cone 108. The other end of the plow blades 74 are rotatably attached by pin 79 to a link or cam follower 76 (so named because its action is responsive to the contoured surface of a bone). For simplicity, only one set of a plow blade and a cam follower member has been shown in FIG. 3. The cam follower cone 107 rotatably supports the cam follower members 76 at their other ends through bolts 80.

Plow cone 108 is driven rotatably by key ring 114 engaging the plow cone 108 through a key 114a. The key ring 114 is in turn driven by a pulley wheel 109 which is fixed to the key ring 114 through plow mounting ring 111. The pulley wheel 109 is in turn driven through pulley belt 158 by pulley wheel 118, which is connected to motor 64 by shaft 116a (FIG. 7).

The drive mechanism for the cam follower cone 107 is similar. A key ring 114' engages the cam follower cone 107 through a key 114a'. The key ring 114' is driven by pulley wheel 109' through cam follower mounting ring 110. A pulley wheel 117 drives pulley wheel 109' through pulley belt 162. The major difference between the drive mechanism for cones 107 and 108 is that pulley wheel 117 is driven by motor 66 (FIG. 7) through a slip clutch 152 having a part 154 connected to shaft 116 and a part 155 connected to shaft 156. Clutch 152 is so arranged and adjusted that slippage is permitted at a predetermined torque exerted on shaft 116. This, as will be explained in more detail hereinafter, causes cones 107 and 108 to rotate at the same speed when plow blades 74 engage a bone.

Referring to FIG. 7, the manner of supporting the cam follower pulley wheel 117 and the plow pulley wheel 118 is shown. The cam follower pulley wheel 117 and the plow pulley wheel 118 are pinned to pulley coupling shafts 116 and 116a, respectively. Each pulley coupling shaft has a collar 116b and 116c, respectively, which rides on bearings. Flanges 115 support the bearings and are suitably fixed to the base plate 105. A pair of motor 64 and 66, supported by base plate 105, are connected to and drive the coupling shafts 116. Since pulley wheel 117 is larger than pulley wheel 118, belt 162 will be driven faster than belt 158 if motors 64 and 66 are turning at the same speed. In this manner, a constant torque can be applied to urge the plow blades against the bone during the stripping operation. A torque controller 73 is provided for the slip clutch 152 to control the torque applied by cam follower cone 107, or to open the plow blades. When the clutch is disconnected by the controller, the system functional forces will cause the shaft 116 to slow down so that the blades will open.

The entire meat stripping cone assembly 56 is supported by a head base plate 105 through a plurality of mounting studs 133, and bearing housing rings 112. A pair of bearings 113a are spaced by bearing separator 113 and permit independent rotation of the key rings 114 and 114′.

A bone-gripping device and bone are shown in phantom lines in FIG. 3 to show the relationship between the plow cone and the bone supporting mechanism. The bone-gripping chuck (as seen also in FIG. 11) has a ball joint hanging body 82 with a strap 84 which cooperates with a closed end 86 to secure a ball joint end of a bone 94. The strap 84 is rotatably pinner at pin 88 to the shank hanging body 82 to facilitate insertion of the bone into the body 82. The bone supporting device prevents the bone 94 from rotating about a vertical axis, but permits lateral movement of the bone within the meat stripping con 56 to permit the bone to center itself within the meat stripping cone 56 during the meat stripping operation. The member 92 can be mounted to arm 50 (FIG. 11) by a universal joint so as to permit the chuck to move in any lateral direction, but to prevent rotation about a vertical axis.

Figure 5:
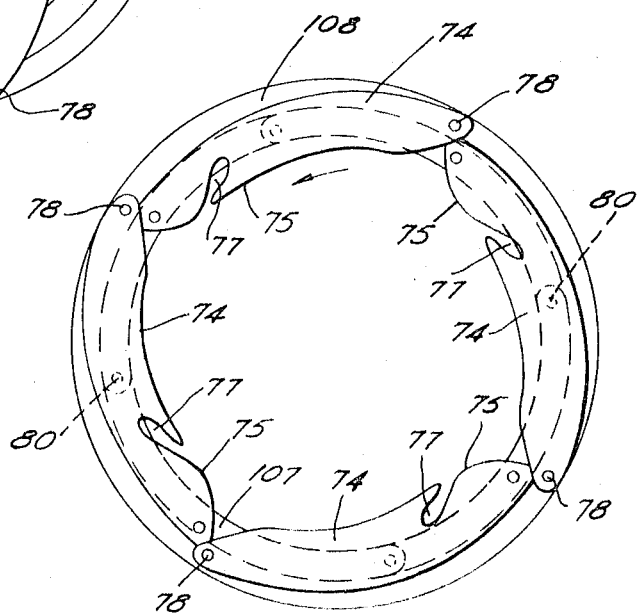
FIG. 5 is a view similar to FIG. 4 showing the plow assembly in open position.
Figure 6:
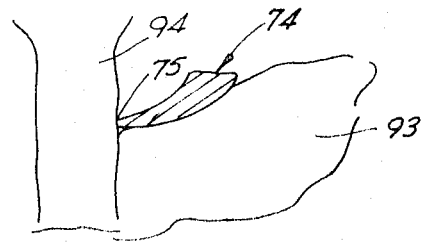
FIG. 6 is a sectional view of a plow blade showing the method of removing the meat from a bone as seen along lines VI—VI of FIG. 3.

The operation and structure of the plow blades 74 is more clearly seen in FIGS. 4 through 6. Each plow blade 76 is arc shaped with the inner portion forming a dull edge 75 for plowing the meat away from the bone. As seen in FIG. 6, the outer surfaces of the plow blade 74 slopes downwardly and inwardly so as to force the meat in an upward and outward direction during the meat stripping operation. Each plow blade 74 has slot 77 cut angularly outwardly from the dull edge 75. The slot 77 will catch meat tendons and tear them away from the bone as the plow blades move in counterclockwise direction as seen in FIGS. 4 and 5. As seen in FIG. 6, the meat is pulled away from the bone as the plow blades rotate and move downwardly relative to the bone.

During the meat stripping operation, the stripping cone support arm 58 moves downwardly relative to the bone supporting arm 50 and both plow cone 108 and the cam follower cone 107 rotate about a central vertical axis. As the meat stripping cone assembly 56 rotates, both cones 107 and 108 rotate. However cone 107, absent any restraint, rotates at a slightly higher speed creating relative, rotary movement between cones 107 and 108. Consequently, absent any restraint, cam follower cone 107 rotates in a counterclockwise direction (as seen in FIG. 4) relative to the plow cone 108. This relative rotation causes links 76 to draw the plow blades 74 to the central portion of the cone, thus forcing the plow blades against a bone, such as bone 94 (FIGS. 3 and 10), located in the cones 107 and 108. When the plow blades 74 are in contact with the bone 94 and therefore cannot move inwardly any further, the clutch 152 permits relative rotation between shafts 116 and 116a (FIG. 7) so that follower cone 107 will rotate at the same speed as the plow cone 108. However, there will be a torque on the cam follower cone 107 to urge the plow blades 74 against the bone 94. The action of all four plow blades tends to center the bone within the annular space provided between the four plow blades. Because the bone is free to move laterally, the bone will automatically tend to center itself during the meat stripping operation.

Figure 9:
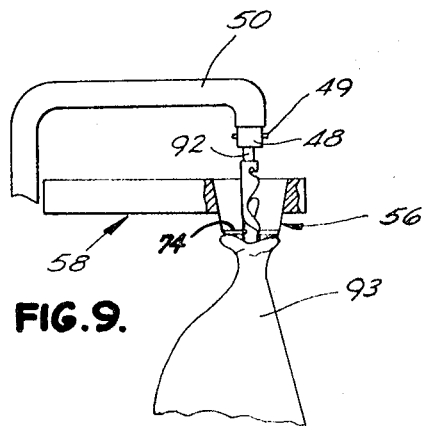
FIG. 9 is a schematic illustration of the plow head in the starting position with the shank end of an animal leg hanging from the bone supporting arm.
Figure 10:
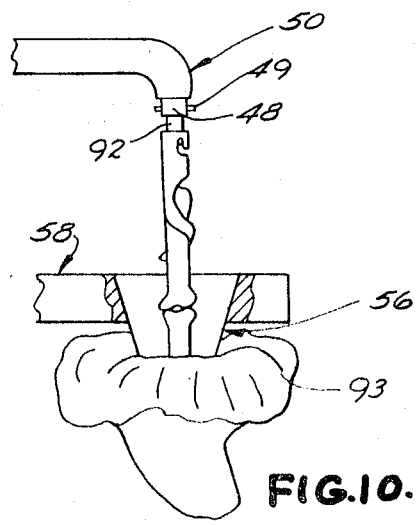
FIG. 10 is a view similar to FIG. 9 showing the plow moved downwardly and illustrating the operation of removing the meat from the bone.

As the stripping cone 56 moves downwardly relative to the bone 94, the plow blades 74, using dull edges 75, merely plow the meat away or separate the meat from the bone as illustrated more clearly in FIGS. 9 and 10. Thus, there is no cutting of the meat during the meat removal operation. The meat is forced away from the bone and kept intact. In this manner, the bone is virtually stripped clean of all meat.

The stripping cone support arm 58 is raised and lowered by a mechanism shown in FIGS. 2 and 8. The threaded rod 70 is pinned in a block 166 which is fixed to base plate 105.

In operation, the nut 71 is rotated in one direction by motor 98 to lower the arm 58 and in the opposite direction to raise the arm 58.

The stripping cone support arm 58 is braced through support rods 60 and 62. The support rods are clamped at the top end to base plate 105 through conventional clamps (not shown). The support rods are slidably retained in block 101 by conventional bearings (not shown).

Figure 11:
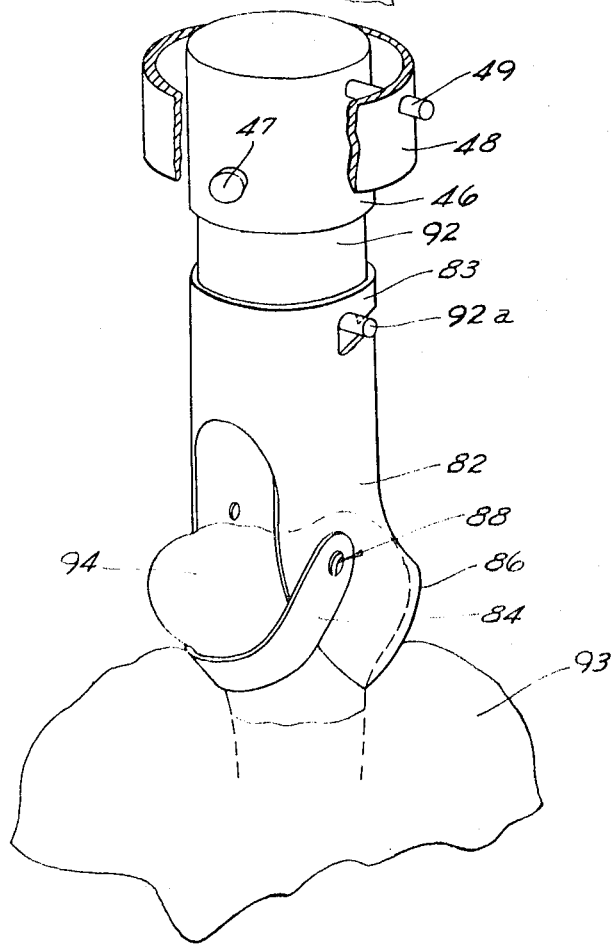
FIG. 11 is a perspective view illustrating a means for hanging the bone from the bone supporting chuck.

Referring now to FIG. 11, the bone supporting member 92 supports body 82 through pins 92a. The body 82 has two slots, each of which form a hook 83 which engages pins 92a. The member 92 is in turn supported by a universal joint so that it is laterally swingable to permit the bone to be centered within the rotating plow blades (as shown schematically in FIGS. 9 and 10). The bone hanging body 82 has a closed end 86 which is bent laterally for engaging the femur bone ball end. The closed end slopes downwardly and inwardly to wedge the trochanter of a femur bone illustrated in FIG. 11. The rounded head of the femur bone engages a strap 84 which is pinned by 88 to the shank hanging body 82. In this manner, the femur bone, supported by the ball joint, is held firmly vertically, restricted from rotational movement, and permitted to move horizontally to center itself within the supporting cone 56.

The universal joint comprises a cylinder 46 which supports member 92 through pin 47, and pipe 48 which supports cylinder 46 through pin 49. Pipe 48 is fixed to the end of bone supporting arm 50.

The femur bone is easily inserted into the chuck shown in FIGS. 3 and 11 by rotating the strap upwardly, inserting the rounded head of the bone into the strap and rotating the bone downwardly to seat the trochanter of the bone against closed end 86. The bone can be easily removed by pushing the bone upwardly into the chuck and following the reverse procedure.

Figure 12:
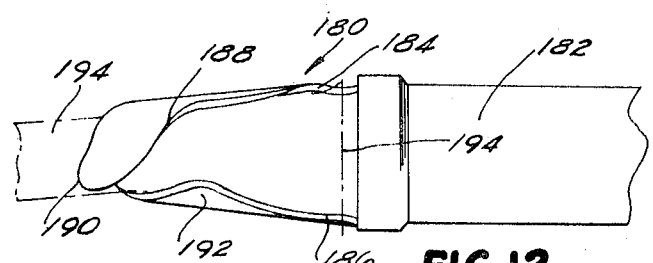
FIG. 12 is a plan view of an alternate embodiment of a chuck which can be employed according to the invention.
Figure 13:
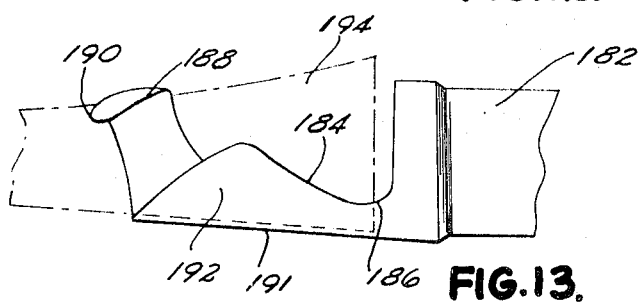
FIG. 13 is a side elevational view of the chuck shown in FIG. 12.
Figure 14:
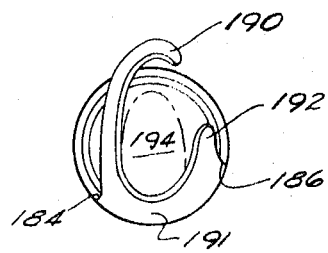
FIG. 14 is an end view of the chuck shown in FIGS. 12 and 13.

Referring now to FIGS. 12, 13 and 14, a tibia bone holding chuck has a cylindrical shaft 182 which is cut away in part to form the holding means. A longitudinal base member 191 has a first upstanding side wall 184 and a second upstanding side wall 186. The first side wall 184 is helically shaped and has a helical edge 188 which ends in a sharpened tip 190. The second side wall 186 extends upwardly and inwardly from the cut away rear portions forming shoulder 192. A tibia bone 194 is shown in phantom lines positioned within the chuck. The first side wall is oval shaped as seen in FIG. 14 to prevent twisting of the bone in a counterclockwise direction as seen in FIG. 14. As can be seen from the drawings, the forwardly and inwardly shaped side walls wedge the end of the bone so as to prevent axial movement of the bone. The oval shape formed by the side walls restrict rotational movement of the bone in a counterclockwise direction around the longitudinal axis of the bone. The bone can be inserted into the chuck by tilting it so that the narrow portion of the bone is inserted between shoulder 192 and helical edge 188. The bone is then pushed into the central open portion and turned so that it is in the position as seen in FIGS. 12, 13 and 14. The chuck is primarily designed for operation of the machine shown in the drawings wherein the plow blades rotate in a direction opposite to the direction of helical arm 184. For a device in which the plow blades rotated in an opposite direction the helical arm would be shaped in the opposite direction. In other words, the direction of the helical arm will oppose the rotational direction of the plow blades.

Figure 15:
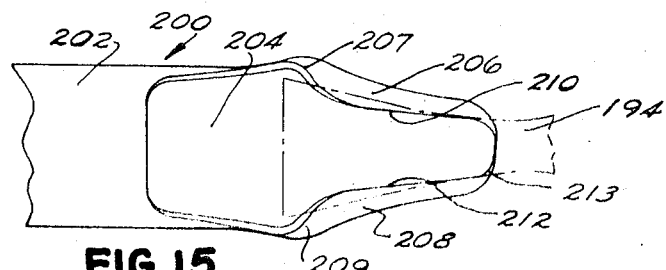
FIG. 15 is a plan view of a third embodiment of a chuck, which can be employed according to the invention.
Figure 16:
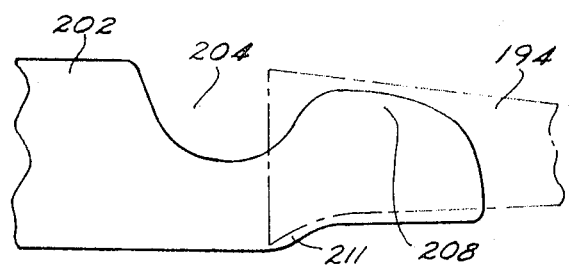
FIG. 16 is a side elevational view of the chuck shown in FIG. 15.
Figure 17:
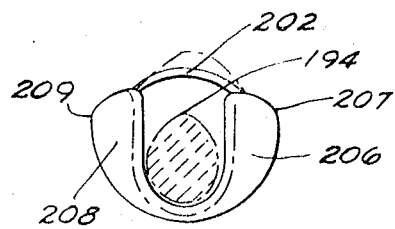
FIG. 17 is an end view of the chuck shown in FIGS. 15 and 16.

Referring now to FIGS. 15, 16 and 17, a second tibia bone holding chuck is shown. The chuck 200 has a cylindrical shaft 202 having a central opening 204 and holding flanges 206 and 208. The holding flanges are bent inwardly at the top portion thereof and are tapered inwardly at the forward end 213. In order to prevent rotation of the bone within the chuck, the forward end 213 is U-shaped. Holding flange 206 has an expanded rear portion 207 and a sharpened edge 210. Holding flange 206 has an expanded edge 209 and a sharpened forward edge 212. The bottom of the chuck is depressed at 211 to conform with the expanded end of the tibia bone. The bone 194 (shown in phantom lines) fits within the chuck between holding flanges 206 and 208. The sharpened edges 210 and 212 aid in removing the meat from the bone as the bone is inserted into the chuck. The tapered flanges 206 and 208 are so shaped as to hold the bone from longitudinal movement away from the chuck and the U-shaped cross section prevents rotational movement of the bone within the chuck about its longitudinal axis.

Both of the alternate chucks shown in FIGS. 12 through 17 are supported by the bone supporting arm 50. Both of these chucks can be supported by a universal joint which will hold the chuck in a fixed vertical position and fixed so that it cannot rotate about a vertical axis, but permitting lateral movement of the bottom portion of the chuck so that the bone can center itself within the meat stripping cone 56. Such a joint is schematically illustrated in FIGS. 9 through 11.

All of the bone holding chucks make use of bone contour to hold the bone for the stripping operation. Each of the chucks is designed so that the force of the stripping cone, plowing the meat away from the bone will be transmitted along the length of the bone. Thus the holding means for the bone will not crush the bone because it is not dependent on the compressive force applied to the bone. It is also apparent that the bone chucks advantageously use bone geometry to prevent relative rotation between the chuck and the bone so that compressive forces on the bone are eliminated.

Figure 18:
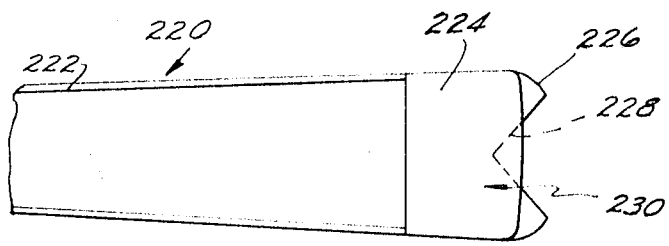
FIG. 18 is a plan view of a fibula bone stripper/remover which can be employed according to the invention.
Figure 19:
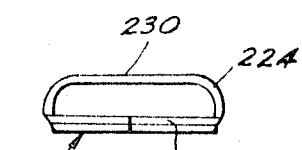
FIG. 19 is an end view of the fibula bone stripper/remover shown in FIG. 18.
Figure 20:
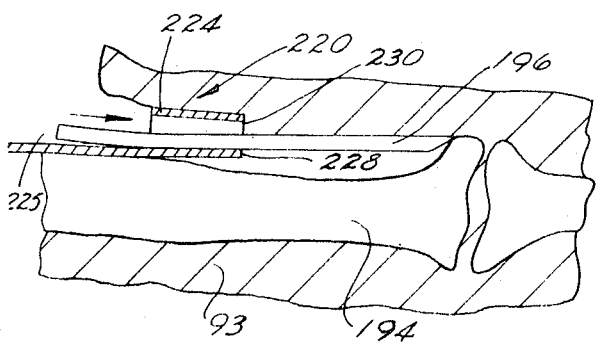
FIG. 20 is a schematic illustration of the operation of the fibula bone stripper/remover.

In stripping meat from animal legs, the fibula bone of the animal is preferably removed before removing the meat from the bone according to the invention. A device for removing the fibula bone is shown in FIGS. 18, 19 and 20. It is to be understood, however, that the novel process and novel apparatus for stripping meat from the bone can be employed to strip the meat from the bone without first removing the fibula bone.

Referring now to FIGS. 18 through 20, the fibula bone remover 220 comprises an longitudinal bar 222 having an oval hollow front portion 224 with a tapered end 226 having an indented sharpened chisel 228, and a front edge 230. As seen in FIG. 20, the fibula bone remover 220 is inserted at the lower joint of the fibula bone and the tibia bone 194. The sharpened chisel 228 breaks the fibula bone 196 from the tibia bone 194. As the fibula bone remover 220 is pushed toward the other end of the bone, the fibula bone is pushed out through hollow portion 224. When the chisel 228 reaches the knee joint, the chisel again breaks the joint between the tibia bone 194 and the fibula bone 196. After the tibia bone is broken away from the fibula bone, the fibula bone 196 can be pulled out of the meat 93.

Referring now to FIGS. 21 through 24, a method and means for removing the kneecap from an animal leg is shown. The kneecap is also preferably removed from the animal leg prior to the meat stripping operation. It is to be emphasized that the removal of the kneecap is a preferred embodiment rather than an essential step in carrying out the inventive process and in using the inventive apparatus.

Figure 24:
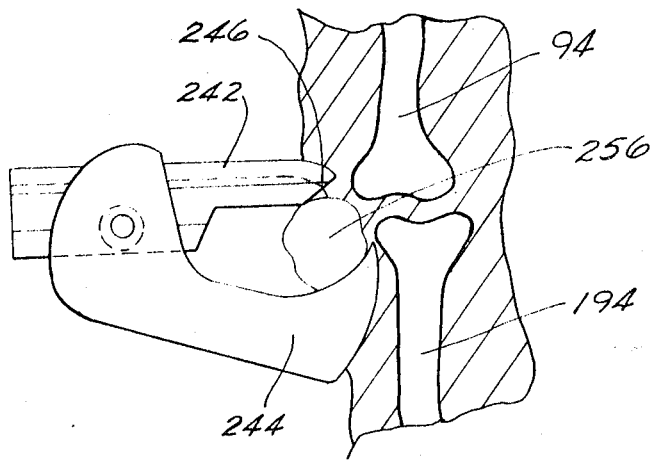
FIG. 24 is a plan view, similar to FIG. 21, showing the removal of the kneecap by the kneecap remover.
Figure 23:
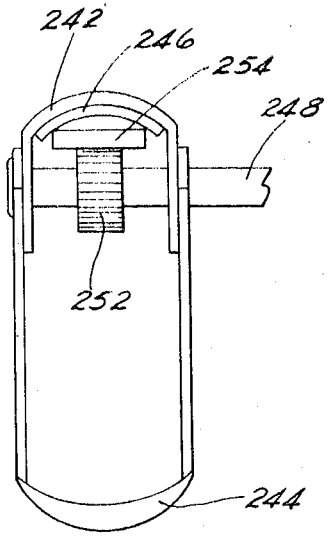
FIG. 23 is an end view of the kneecap remover shown in FIGS. 21 and 22.
Figure 21:
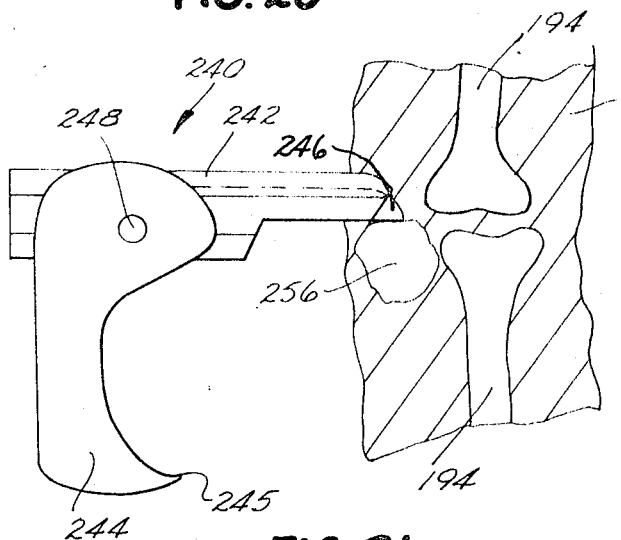
FIG. 21 is a plan view of a kneecap remover as initially positioned for removing a kneecap from an animal leg.
Figure 22:
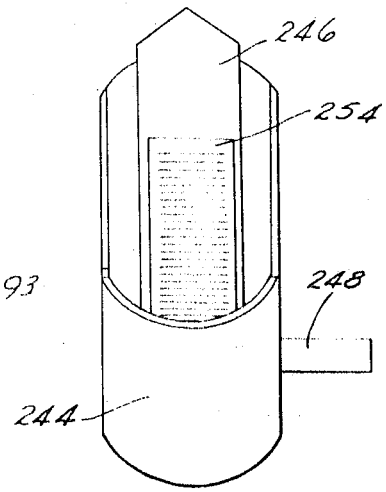
FIG. 22 is a side elevational view of the kneecap remover shown in FIG. 21.

The kneecap remover 240 has a blade holder 242 which slidably engages a pointed blade 246. The blade 246 is positioned adjacent the kneecap 256 of the animal. The blade is sharpened at the edges so that it can penetrate the flesh adjacent to the kneecap as shown in FIG. 21. An exciser 244 having a sharpened edge 245 is supported for rotation relative to blade holder 242 on a pin 248. A gear 252 is attached to pin 248 and engages a rack 254 on blade 246. As the exciser 244 rotates relative to holder 242 to remove the kneecap 256, as seen in FIG. 24, the blade 246 retracts within 242 so that the exciser 244 can cut behind the kneecap 256 and shear off the tendons supporting it between exciser 244 and blade holder 242.

Whereas the invention has been described with relation to a particular apparatus for carrying out the process, it is obvious that other mechanical arrangements can be employed without departing from the spirit of the invention. For example, other means could be devised for rotating the concentric rings which drive the plow blades and the cam followers. The alternate driving means could employ a single motor having dual power take-off means and a clutch to control the speed of one of the power take-off means. Similarly, other methods of raising and lowering the stripping cone support arms could be devised.

Whereas the invention has been described with reference to the meat stripping cone moving downwardly relative to a stationary bone, it is within the scope of the invention to move the bone upwardly relative to a vertically stationary rotating stripping cone.

Other variations and modifications will be suggested to those skilled in the art without departing from the scope of the invention.

The embodiments of the invention in which an exclusive property or privilege is claimed are defined as follows:

1. An apparatus for removing bones from animal meat cuts such as legs, shoulders, and the like, said apparatus comprising:
   bone holding means;
   meat plowing means, including a plurality of plow members having dull edges adapted to contact a bone in said bone holding means and surfaces in contact with meat as it leaves the bone inclined upwardly away from said bone;
   means for urging said plow members against said bone;
   means for effecting relative rotation between said bone in said bone holding means and said plow members such that said plow members rotate relative to a longitudinal axis of said bone; and
   means for effecting relative longitudinal movement between said bone holding means and said meat plowing means as said plow members rotate relative to said longitudinal axis of said bone whereby meat on said bone is plowed away from said bone without cutting of said meat.

2. An apparatus according to claim 1 wherein said plow members have tendon engaging means whereby as said meat is plowed away from said bones, tendons in said meat are engaged by said tendon engaging means and pulled away from said bone.

3. An apparatus according to claim 2 wherein said tendon engaging means comprises a narrow slot in said plow blades extending from said dull edge outwardly away from said bone at an angle to said dull edge.

4. An apparatus according to claim 1 wherein said plow members slope outwardly from said dull edge and away from said direction of movement of said plow members relative to said bone holding means such that meat, as it is plowed, is cammed away from said bone.

5. An apparatus according to claim 1 wherein said bone holding means is so shaped as to wedge an expanded end of said bone within said holding means such that said bone cannot be dislodged from said bone holding means by pulling said bone in a longitudinal direction away from said bone holding means, and such that said bone cannot be rotated about a longitudinal axis relative to said bone holding means, at least while pulling in said longitudinal direction.

6. An apparatus according to claim 5 wherein said bone holding means is adapted to engage the upper end portion of the femur bone, said bone holding means having a strap to engage the rounded edge of said femur bone and an opposed inwardly and downwardly sloping wall to position and hold the trochanter of said femur bone when said bone is pulled longitudinally away from said holding means.

7. An apparatus according to claim 6 wherein said strap is rotatably attached to said holding means so that said bone can be easily positioned within and removed from said bone holding means.

8. An apparatus according to claim 5 wherein said bone holding means has a longitudinal base member, a first arm extending out of a side of said base member, and having a helical edge, a second arm extending out of another side of said base member and spaced from said first arm, said second arm having a forward edge parallel to a portion of said helical edge forming a slot between said forward edge and said portion of said helical edge, said slot being at an oblique angle to said base member whereby a tibia bone can be inserted through said oblique slot and centered between said first and second arms with the longitudinal axis of said bone aligned with the longitudinal axis of said base member and oblique to said slot.

9. An apparatus according to claim 5 wherein said bone holding means comprises: a longitudinal base member; a pair of arms extending upwardly from said base member gradually tapering inwardly at a forward end, said arms being bent inwardly at a rear top portion thereof, said base and upstanding arms forming a U-shape at said forward end, whereby a tibia bone can be inserted into said holding means with a narrow portion within said U-shaped forward end and with the expanded end portion of said tibia bone being restrained against longitudinal movement by said rear portion of said arms restrained from rotational motion about its longitudinal axis by said upstanding arms.

10. An apparatus according to claim 9 wherein the forward upper edges of said arms are sharpened for cutting meat away from the bone as the bone is positioned between said arms.

11. An apparatus according to claim 1 wherein said meat plowing means further comprises:
a pair of concentric rings supported for independent rotation about a central axis;
means for driving said concentric rings at different relative speeds independent of each other;
said plow members are rotatably attached to one of said rings;
said urging means comprises a link member which is rotatably attached to an inner end portion of said plow member and rotatably attached to the other of said concentric rings;
whereby the movement of said plow members toward and away from said bone, and against said bone, can be controlled by varying the relative speeds of said concentric rings.

12. An apparatus according to claim 11 wherein said driving means comprises means for varying the speeds of at least one of said concentric rings so that the outer ring can be driven faster or slower than the inner ring.

13. An apparatus for removing bones from meat cuts and the like comprising:
an outer support member;
an inner member having a bone receiving aperture and being rotatably mounted within said outer member so that said inner member is rotatable about a central axis;
plow blade means having dull inner edges rotatably supported by said inner member movable toward and away from said central axis of said inner member;
means yieldingly urging said plow blade means radially inwardly toward said axis, said plow means being yieldable radially outwardly of said axis in response to said edges encountering enlarged sections of said bones; and
means to drive said inner member whereby meat on animal bones can be removed therefrom by causing said bone to move through the rotating plow blades while the plow blades are yieldingly urged against the bone.

14. An apparatus according to claim 13 wherein said dull inner edge of said plow blade means terminates in a rounded inner end which contacts said bone.

15. An apparatus according to claim 14 wherein said plow blade means have a tendon engaging means comprising a narrow slot extending from said dull edge near said rounded end outwardly and away from said bone and said dull edge.

16. An apparatus according to claim 15 wherein said plow blade means are tapered outwardly and upwardly so that meat on said bones will be cammed away from said bones as said bones are pulled upwardly through said rotating plow blade means.

17. An apparatus for removing bones from meat cuts and the like comprising:
a bone holder;
a first member;
a second member;
means rotatably supporting said first and second members so that each of said first and second members can rotate about a central axis independently of each other;
blade means rotatably supported by one of said first and second members, said blade means having meat removing edges movable toward and away from said central axis of rotation;
means to control the movement of said blade means relative to said central axis in response to the relative rotation of said first and second members causing said meat removing edges to move radially inwardly and outwardly depending upon the direction of said relative rotation; and
means to cause rotation of said first and second members whereby meat on animal bones can be removed therefrom by causing a bone in said bone holder to move through the rotating meat removing edges while the blades are yieldingly urged against said bone.

18. The apparatus of claim 17 in which the means for causing rotation of said members is a differential speed means which causes a differential in the rotational speed of said first and second members until the meat removing edges of said blade means encounters the surface of said bone.

19. The apparatus of claim 17 in which said first member and said second member are concentric rings.

20. The apparatus of claim 17 in which the meat removing edges are dull whereby they plow through the meat and separate it from the bone.

21. The apparatus of claim 20 wherein said dull inner edge of said blade means terminates in a rounded inner end which contacts said bone.

22. The apparatus of claim 21 wherein said blade means have a tendon engaging means to catch tendons as said blade means rotates about said bone and pulls said tendons away from said bone.

23. The apparatus of claim 22 wherein said blade means are tapered outwardly and upwardly so that meat on said bones will be cammed away from said bones as said bones are pulled upwardly through said rotaing blade means.

References Cited
UNITED STATES PATENTS

| | | |
|---|---|---|
| 1,435,877 | 11/1922 | Reubold. |
| 2,785,434 | 3/1957 | Terranova. |
| 2,857,619 | 10/1958 | Massengill. |
| 2,893,051 | 7/1959 | Massengill. |
| 3,210,801 | 10/1965 | Terranova. |
| 3,402,423 | 9/1968 | Helgeson et al. |

LUCIE H. LAUDENSLAGER, Primary Examiner

U.S. Cl. X.R.

17—45